(12) United States Patent
Maroske et al.

(10) Patent No.: US 9,388,043 B2
(45) Date of Patent: *Jul. 12, 2016

(54) CHEMICAL OXYGEN GENERATOR WITH CHEMICAL CORES ARRANGED IN PARALLEL

(71) Applicant: B/E AEROSPACE, INC., Wellington, FL (US)

(72) Inventors: Gerald Maroske, Lübeck (DE); Rainer Ernst, Stockelsdorf (DE); Yunchang Zhang, Overland Park, KS (US); Girish S. Kshirsagar, Overland park, KS (US)

(73) Assignee: B/E AEROSPACE, INC., Wellington, FL (US)

( * ) Notice: Subject to any disclaimer, the term of this patent is extended or adjusted under 35 U.S.C. 154(b) by 71 days.

This patent is subject to a terminal disclaimer.

(21) Appl. No.: 14/272,683

(22) Filed: May 8, 2014

(65) Prior Publication Data

US 2014/0241961 A1    Aug. 28, 2014

Related U.S. Application Data

(63) Continuation of application No. 13/438,723, filed on Apr. 3, 2012, now Pat. No. 8,741,221.

(51) Int. Cl.
*A62B 7/08* (2006.01)
*C01B 13/02* (2006.01)
*A62B 21/00* (2006.01)
*A62B 7/14* (2006.01)

(52) U.S. Cl.
CPC . *C01B 13/02* (2013.01); *A62B 7/08* (2013.01); *A62B 21/00* (2013.01); *C01B 13/0218* (2013.01); *C01B 13/0233* (2013.01); *C01B 13/0296* (2013.01); *A62B 7/14* (2013.01)

(58) Field of Classification Search
CPC ............. A62B 7/08; A62B 21/00; A62B 7/14
USPC ......................................................... 422/120
See application file for complete search history.

(56) References Cited

U.S. PATENT DOCUMENTS

| 3,536,456 A | 10/1970 | Bovard |
| 4,055,434 A | 10/1977 | Chen et al. |
| 4,822,572 A | 4/1989 | van der Smissen et al. |

(Continued)

FOREIGN PATENT DOCUMENTS

| CH | 139956 A | 5/1930 |
| DE | 4142504 C1 | 3/1993 |
| GB | 2160187 A | 12/1985 |

OTHER PUBLICATIONS

International Search Report, Apr. 22, 2014, 4 pages.

*Primary Examiner* — Sean E Conley
*Assistant Examiner* — Donald Spamer
(74) *Attorney, Agent, or Firm* — Fulwider Patton LLP

(57) ABSTRACT

A chemical oxygen generator includes multiple parallel sequentially connected chemical core sections that extend the duration of operation of the chemical oxygen generator. An end of a first core section is contiguous with a chemical core high reactivity section, and a thermal insulation layer is disposed between an end of a second core section and the chemical core ignition plate, as well as between the bodies of the first and second core sections. A chemical core transition section is disposed between the other end of the first core section and the second core section, to insure that the reaction front propagates properly.

15 Claims, 4 Drawing Sheets

(56) References Cited

U.S. PATENT DOCUMENTS

| | | |
|---|---|---|
| 5,198,147 A | 3/1993 | Zhang et al. |
| 5,322,669 A | 6/1994 | Bechthold et al. |
| 5,443,798 A | 8/1995 | Kerrebrock |
| 5,725,834 A | 3/1998 | Nishii et al. |
| 6,099,806 A | 8/2000 | Cortellucci et al. |
| 6,193,907 B1 | 2/2001 | Zhang et al. |
| 8,741,221 B2 * | 6/2014 | Maroske .......... A62B 7/08 422/120 |
| 2001/0030311 A1 | 10/2001 | Zhang et al. |

* cited by examiner

CHEMICAL OXYGEN GENERATOR WITH CHEMICAL CORES ARRANGED IN PARALLEL

CROSS-REFERENCES TO RELATED APPLICATIONS

This is a continuation of application Ser. No. 13/438,723, filed on Apr. 3, 2012, now U.S. Pat. No. 8,741,221, incorporated by reference in its entirety.

BACKGROUND OF THE INVENTION

This invention relates generally to chemical oxygen generators for civilian and military airplanes to provide supplemental oxygen, and more particularly relates to a chemical oxygen generator having a chemical oxygen generating core assembly composed of multiple sections, with at least two of the sections arranged in parallel so that a duration of operation of the chemical oxygen generator can be extended without increasing the length of the generator.

Chemical oxygen generators are typically used in situations requiring the generation of supplemental oxygen, such as in aviation and in submarines, for example, and in other similar settings where it is useful to furnish a convenient and reliable supply of oxygen gas of breathable quality. Chemical oxygen generating compositions based upon the decomposition of alkali metal chlorates or perchlorates have long been used as an emergency source of breathable oxygen in passenger aircraft, for example.

An aircraft oxygen generator is commonly preprogrammed according to the descent profile of a given type of airplane, and must meet the minimum oxygen flow requirement at all times during a descent. When the oxygen generating reaction is initiated at one end of the core, the reaction front propagates along the longitudinal axis toward the other end of the core as oxygen is generated. Ideally, the reaction zone moves at a steady, repeatable rate governed by the amounts of fuel and catalyst incorporated at a given point along the length of the core. Once initiated, a reaction front moves from the ignition end to the outlet end of the generator, producing oxygen.

One conventional chemical oxygen generator is known that includes an oxygen generating candle having a chemical core with a slightly tapered cylindrical shape. Once initiated, the candle will sustain decomposition to release breathable oxygen until the candle is completely reacted. However, since the reaction front needs to move at a certain linear rate, the length of the chemical core has to be increased when a relatively longer duration of operation is needed. Due to the limited space available in aircraft, it is difficult to increase the generator length beyond the length of the typical space envelope provided for an oxygen generator, so that heavier cores are typically used in such conventional chemical oxygen generators to insure the chemical cores have sufficient duration.

One known chemical oxygen generator includes an elongate rigid thermal insulating section, and a conduit section on one side of the rigid section providing multiple gas flow paths for conducting released oxygen from a burning candle along the plate for increasing the burning action of the burning portion of the candle and pre-heating the unburned portion of the candle. A plurality of the plates are combined to form a honeycomb type separator assembly made from interlocking ceramic plates for surrounding a candle, and a number of such separator assemblies are combined to form a multi-candle oxygen generator for oxygen supply flow profiles that require a high initial flow rate. The honeycomb type separator occupies a substantial volume and increases weight of the chemical candle, and is not suitable for aviation use.

In order for the oxygen generating reaction in a chemical oxygen generator to remain sufficiently stable that the reaction is not extinguished, the reaction front must move with a sufficiently high linear velocity. If the reaction front moves too slowly, the reaction becomes less controllable, and may stop. In order to maintain a minimum reaction front linear velocity and meet requirements for a duration of operation of the chemical oxygen generator, typically it has been necessary to increase the weight or length of the chemical core of the chemical oxygen generator, resulting in an increase in the weight or length of the chemical oxygen generator. Some aircraft may require a very long duration, while requiring a high flow rate in the first few minutes, such as the profile shown in FIG. 3.

Particularly for aircraft, it would be desirable to provide a chemical oxygen generator that permits extension of the duration of operation of the chemical oxygen generator without increasing the weight or length of the generator. The present invention meets these and other needs.

SUMMARY OF THE INVENTION

Briefly and in general terms, the present invention provides for a chemical oxygen generator including an oxygen generating composition for producing a supplemental breathable gas when a reaction front propagates through the oxygen generating composition, with a plurality of parallel sequentially connected chemical core sections that extend the duration of operation of the chemical oxygen generator without increasing the weight or length of the generator.

Accordingly, the chemical oxygen generator of the invention includes a chemical oxygen generator housing having an ignition end and an opposing oxygen outlet end, a chemical core ignition plate in the ignition end of the chemical oxygen generator housing, a chemical core high reactivity section in the chemical oxygen generator housing immediately adjacent to and contiguous with the chemical core ignition plate, and a plurality of parallel sequentially connected chemical core sections in the chemical oxygen generator housing. The plurality of parallel sequentially connected chemical core sections can include an oxygen generating composition and have first ends oriented toward the ignition end of the chemical oxygen generator, second ends oriented toward the outlet end of the chemical oxygen generator, and body portions between the first and second ends extending a length along a longitudinal axis of the chemical oxygen generator housing, with a first end of a first one of the plurality of parallel sequentially connected chemical core sections disposed immediately adjacent to and contiguous with the chemical core high reactivity section.

In a presently preferred aspect, the chemical core ignition plate includes a primer cap. In another presently preferred aspect, the ignition plate and the high reactive section have the same diameter, although the diameter of the ignition plate may alternatively be smaller than the diameter of the high reactive section. In another presently preferred aspect, the high reactivity section includes a recess, and the ignition plate is disposed within the recess of the high reactivity section. In another presently preferred aspect, the chemical core ignition plate includes an activation powder configured to ignite the chemical core ignition plate and a primer cap configured to ignite the activation powder. In another presently preferred aspect, the ignition plate and the high reactivity section may be formed as a single piece. In another presently preferred aspect, the ignition plate and the high reactivity layer cover only one of the plurality of parallel chemical core sections.

In another presently preferred aspect, the plurality of parallel sequentially connected chemical core sections are arranged generally in the form of a cylinder. In another presently preferred aspect, the plurality of parallel sequentially connected chemical core sections have a length substantially longer than a diameter of the plurality of parallel sequentially connected chemical core sections. In another presently preferred aspect, the plurality of parallel sequentially connected chemical core sections has higher activity at the ignition end, and progressively less activity toward an opposition end of the plurality of parallel sequentially connected chemical core sections. In another presently preferred aspect, the plurality of parallel chemical core sections are formed with equal cross sectional area.

A thermal insulation layer is disposed in the chemical oxygen generator housing between the second end of a second one of the plurality of parallel sequentially connected chemical core sections and the chemical core ignition plate, between the second end of the second one of the plurality of parallel sequentially connected chemical core sections and the first end of the first one of the plurality of parallel sequentially connected chemical core sections, and between the body of the second one of the plurality of parallel sequentially connected chemical core sections and the body of the first one of the plurality of parallel sequentially connected chemical core sections. In a presently preferred aspect, the thermal insulation layer comprises a plate formed of a refractory fiber material. In another presently preferred aspect, wherein the refractory fiber material may be an alumino-silicate refractory ceramic fiber, a ceramic fiber paper, a ceramic wool impregnated with calcium hydroxide, refractory board formed from calcium silicate, or glass wool, for example.

A chemical core transition section is disposed between and immediately adjacent to and contiguous with the second end of the first one of the plurality of parallel sequentially connected chemical core sections and the first end of the second one of the plurality of parallel sequentially connected chemical core sections, to insure that the reaction front propagates from the second end of the first one of the plurality of parallel sequentially connected chemical core sections to the second end of the second one of the plurality of parallel sequentially connected chemical core sections when the reaction front reaches the second end of the first one of the plurality of parallel sequentially connected chemical core sections. In a presently preferred aspect, the transition section comprises a highly reactive oxygen generating composition layer. In another presently preferred aspect, the transition section is oriented at approximately 45 degrees to a longitudinal axis of the chemical oxygen generator housing. In another presently preferred aspect, the transition section is configured to force the reaction front to travel from the second end of the first one of the plurality of parallel chemical core sections to the second end of the second one of the plurality of parallel chemical core sections orthogonally to the longitudinal axis of the chemical oxygen generator housing. In the chemical core arrangement of this invention, the reaction front moves along the first of the parallel core sections, and after the first section has been consumed, the reaction front moves to the next core section in parallel through the transition section, and proceeds from the outlet end toward the ignition end, so that the reaction front velocity and duration of operation of the chemical oxygen generator can be increased without increasing the length of the chemical oxygen generator.

Other features and advantages of the present invention will become more apparent from the following detailed description of the preferred embodiments in conjunction with the accompanying drawings, which illustrate, by way of example, the operation of the invention.

DETAILED DESCRIPTION OF THE PREFERRED EMBODIMENTS

Figures 1A, 1B:
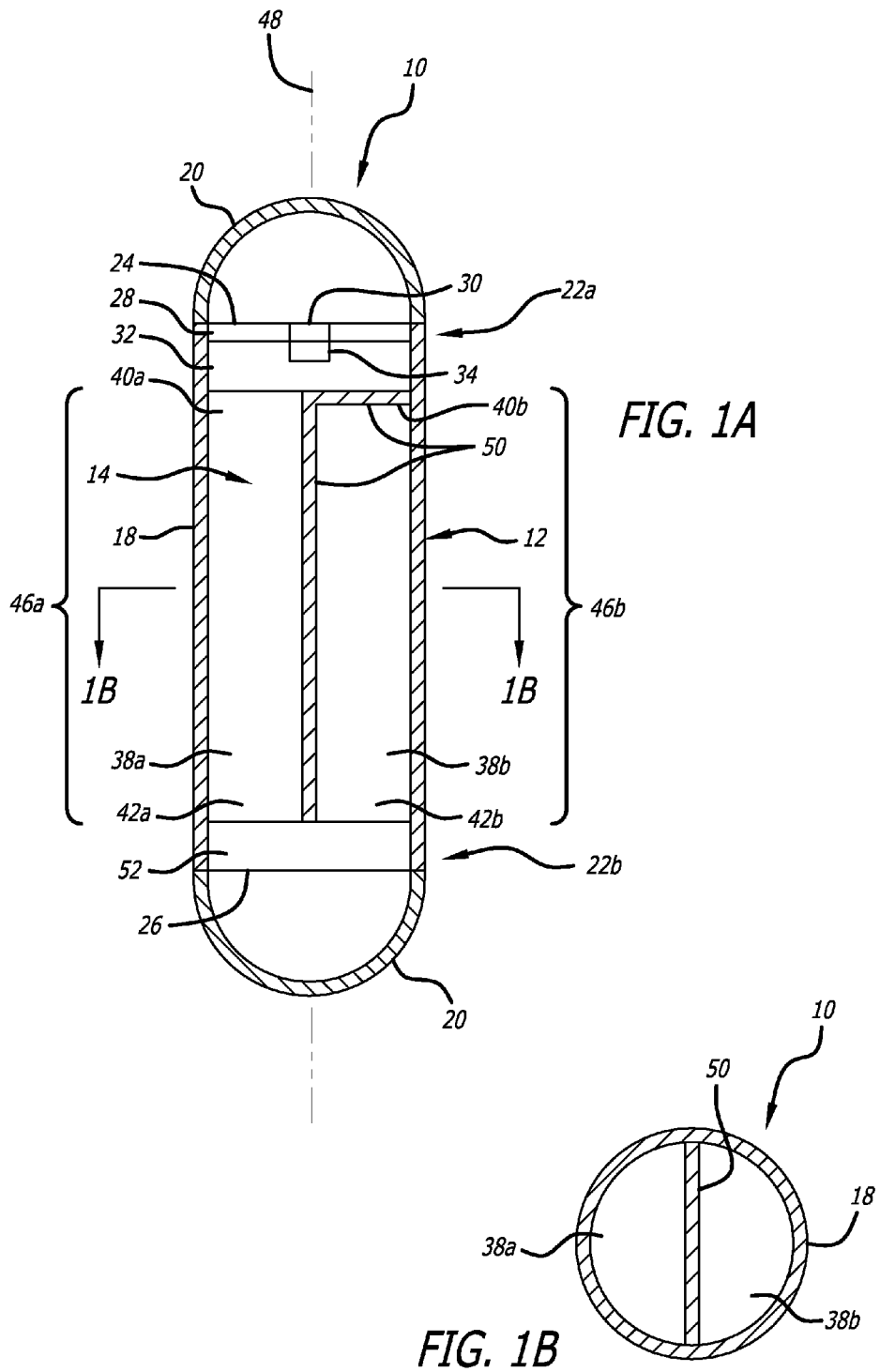
FIG. 1A is a cross-sectional schematic view of a first embodiment of a chemical oxygen generator core assembly according to the present invention.
FIG. 1B is a cross-sectional schematic view taken along line 1B-1B of FIG. 1A.

Referring to the drawings, which are provided by way of example, and not by way of limitation, the present invention provides for a chemical oxygen generator including a plurality of parallel sequentially connected chemical core sections that extend the duration of operation of the chemical oxygen generator without increasing the weight or length of the generator. The present invention accordingly provides for a chemical oxygen generator 10 including a chemical oxygen generator housing 12 containing a chemical core assembly 14 including one or more oxygen generating compositions for producing a supplemental breathable gas when a reaction front propagates through the oxygen generating composition. The chemical oxygen generator housing is typically formed of stainless steel, and can be formed by wrapping the chemical core assembly in a stainless steel sheet, perforated stainless steel sheet, or stainless steel wire mesh, for example, to form the main generally cylindrical body 18 of the chemical oxygen generator housing, although other suitable similar materials may also be used. The wrapped core assembly is typically held tightly between two stainless steel cups 20 that are fixedly attached to both ends 22*a*, 22*b* of the main generally cylindrical body of the chemical oxygen generator housing.

The oxygen generating compositions of the chemical core assembly are typically sodium chlorate based oxygen generating compositions. As is illustrated in FIGS. 1A to 2B, the chemical core assembly includes a first or ignition end 24, shown at the top of the figures, and an opposing second or outlet end 26, shown at the bottom of the figures. The chemical core assembly preferably is formed of solid material, and is generally is constructed so as to have the form of a cylinder, with a length much longer than its diameter. The chemical core assembly also preferably has higher activity at the ignition or combustion initiation end, and becomes progressively less active toward the other end, so as to have an oxygen generation profile or oxygen flow curve that satisfies the oxygen requirements for a given aircraft descent profile.

The chemical core assembly preferably is formed to have a chemical core ignition plate or hot plate 28 disposed in the first or ignition end of the chemical oxygen generator housing, and typically includes a percussion primer cap 30. The chemical core ignition plate can be ignited directly by the percussion primer cap, or by the heat of an activation powder that is ignited by the percussion primer cap. The chemical core ignition plate can also be ignited by other means such as hot wire or a water initiated chemical composition.

A chemical core high reactivity section 32 including a highly reactive oxygen generating composition is preferably disposed in the chemical oxygen generator housing immediately adjacent to and contiguous with or touching the chemical core ignition plate. Once ignited, the ignition plate reacts rapidly, and the heat from the reaction will start the reaction of the high reactivity section. The ignition plate may have the same diameter as that of the high reactive section, or may have a much smaller diameter than the high reactive section. A recess 34 can be formed in a middle area of the high reactivity section, and a portion of the chemical core ignition plate can be located inside this recess. Alternatively, the ignition plate and the high reactivity section can also be constructed as a single piece.

Figure 2A:
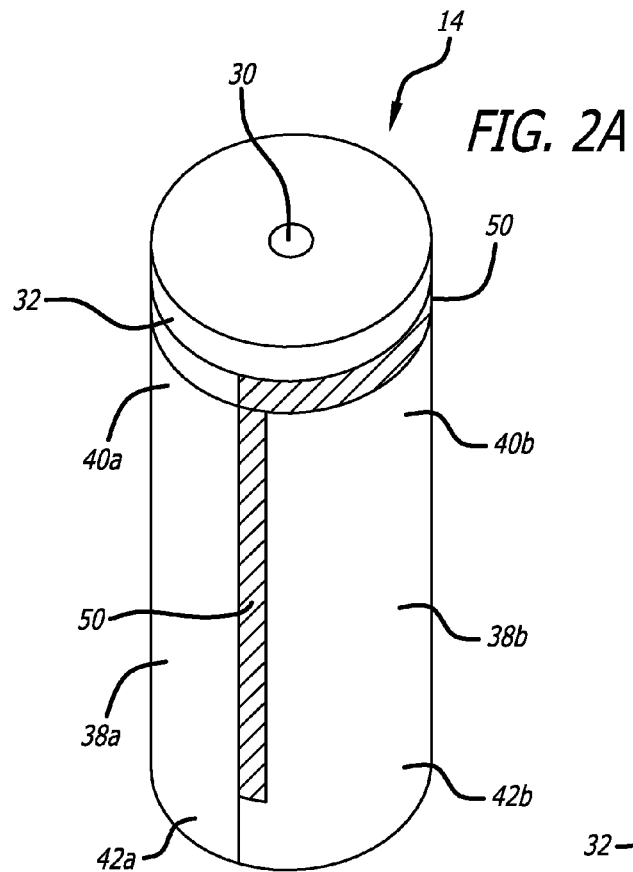
FIG. 2A is a perspective view of a second embodiment of a chemical oxygen generator core assembly according to the present invention.
Figure 2B:
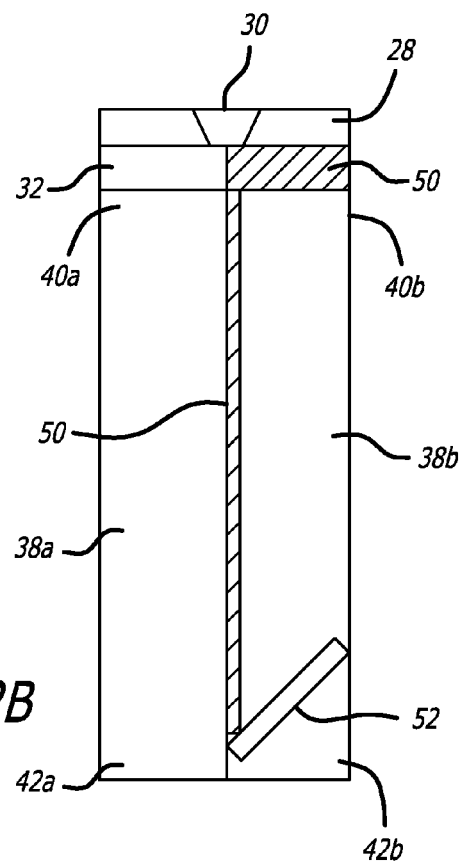
FIG. 2B is a cross-sectional schematic view of the chemical oxygen generator core assembly of FIG. 2A.
Figure 3:
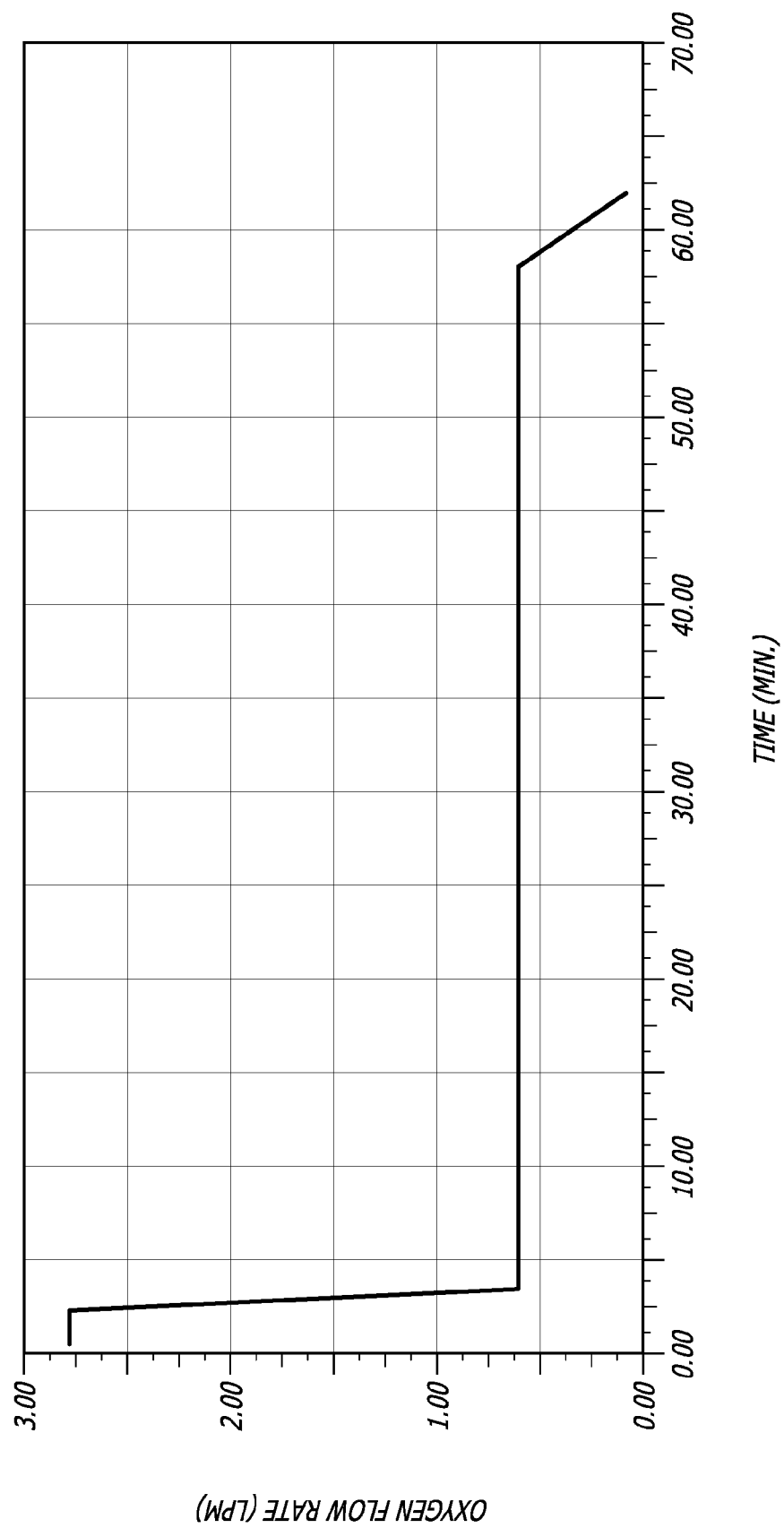
FIG. 3 is an idealized oxygen flow profile of a chemical oxygen generator with a relatively long duration.

The chemical core assembly also advantageously includes a plurality of parallel chemical core sections disposed in the chemical oxygen generator housing, such as first and second parallel chemical core sections 38a, 38b, although the plurality of parallel chemical core sections may alternatively include three or more parallel sections. The high reactivity section preferably not only has a high chemical reactivity relative to the chemical reactivity of the plurality of parallel chemical core sections, but also preferably has a cross sectional area that is relatively larger than the cross sectional area of each of the plurality of parallel chemical core sections, so that the chemical core high reactivity section thus is capable of generating oxygen gas comparatively rapidly to provide a relatively high initial oxygen flow rate that is required by many aircraft descent profiles, as shown in FIG. 3. As is illustrated in FIG. 1A, the ignition plate and high reactivity layer may substantially cover the plurality of parallel core sections, although as is illustrated in FIGS. 2A and 2B, the ignition plate and high reactivity layer may cover only one of the plurality of parallel core sections.

The plurality of parallel chemical core sections are formed of at least one oxygen generating composition, and include first ends 40a, 40b oriented toward the ignition end of the chemical oxygen generator, second ends 42a, 42b oriented toward the outlet end of the chemical oxygen generator, and body portions 44a, 44b between the first and second ends, respectively, extending a length 46a, 46b along a longitudinal axis 48 of the chemical oxygen generator housing. The first end of the first parallel chemical core section is preferably disposed immediately adjacent to and contiguous with or touching the chemical core high reactivity section. The parallel sections can be made with substantial equal cross sectional area, or alternatively, the parallel section that is positioned to react first can be made to have a slightly larger cross sectional area than that of the other parallel section or sections.

A thermal insulation layer 50 is also preferably disposed in the chemical oxygen generator housing between the second end of the second parallel chemical core section and the chemical core ignition plate, between the second end of the second parallel chemical core section and the first end of the first parallel chemical core section, and between the body of the second parallel chemical core section and the body of said first parallel chemical core section. The thermal insulation layer between the high reactivity section and the second parallel section and between the parallel sections prevents the second parallel section from reacting before the first parallel section is consumed. The insulation can be a prefabricated material or can be incorporated in-situ as part of the chemical core manufacturing process, and is typically formed as a light weight and rigid thermal insulating plate from a refractory fiber, such as an alumino-silicate refractory ceramic fiber, or a ceramic fiber paper for high temperature thermal insulation such as a ceramic wool impregnated with calcium hydroxide, for example, both available from UNIFRAX CORPORATION, under the brand name FIBERFRAX, or other similar high temperature thermal insulation materials, may be suitable. Calcium hydroxide can also be included in the thermal insulation layer to help remove residual chlorine in the oxygen produced. A light weight refractory board such as a refractory board made from calcium silicate, flexible insulating materials such as a refractory ceramic fiber high temperature insulation sheet material, glass wool, or lightweight flexible and organic impurity free aerogel insulation for high temperature applications may also be used.

The chemical core assembly also typically includes a transition section 52, preferably including a highly reactive oxygen generating composition, disposed in the chemical oxygen generator housing between and immediately adjacent to and contiguous with or touching the second end of the first parallel chemical core section and the first end of the second parallel chemical core section. Referring to FIGS. 1A, 2A and 2B, this high activity layer at the bottom of the second section makes it easier for the reaction front to propagate from the section on the left hand side to the right hand side. The transition section is preferably configured to insure that the reaction front propagates from the second end of the first parallel chemical core section to the second end of the second parallel chemical core section when the reaction front reaches the second end of the first parallel chemical core section. The parallel core sections thereby effectively prolong the reaction time without an increase in length. The transition section is preferably configured to force the reaction front to travel from the second end of the first parallel chemical core section to the second end of the second parallel chemical core section orthogonally to the longitudinal axis of the chemical oxygen generator housing.

Once the ignition plate is ignited, the heat starts the reaction of the high reactivity section. The reaction then proceeds through the parallel section on the left hand side, the transition section, and then the parallel section on the right hand side. In the arrangement, the operation duration of the chemical oxygen generator can be nearly doubled without increase in the generator length. The heat from the high reactivity section will then start the reaction of the first parallel chemical core section, and the reaction front will propagate toward the outlet end of the first core parallel section. The insulation layer between the high reactivity section and the second parallel chemical core section and between the first and second parallel chemical core sections prevents the second parallel chemical core section from reacting before the first parallel chemical core section is consumed. Once the reaction front reaches the transition section, the reaction front causes the transition section to react. Heat from the transition section then starts the reaction of the second parallel chemical core section, and the reaction front propagates in the second parallel chemical core section from the outlet end toward the ignition end. The two parallel core sections can therefore effectively prolong the reaction time without an increase in length.

Figure 4:
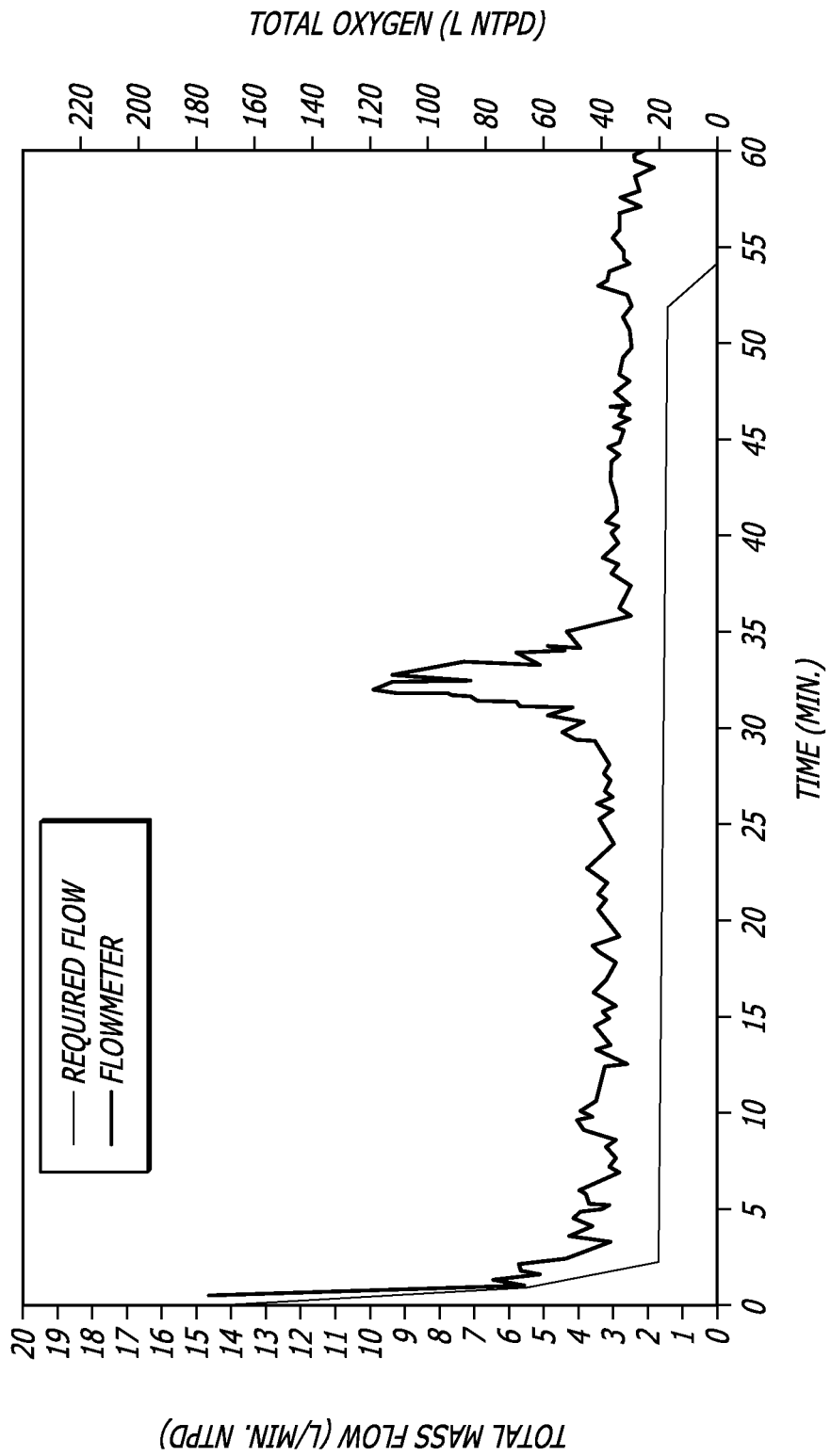
FIG. 4 is an oxygen flow profile of a chemical oxygen generator with a chemical core assembly with parallel sections, according to the present invention.

As is illustrated in FIG. 2B, in one presently preferred aspect, the transition section can be oriented at an angle of approximately 45 degrees relative to the longitudinal axis of the chemical oxygen generator housing. In this arrangement, a split core was loaded with an ignition plate on top of only one half of the chemical core. The transition was done by closing the gap with an extension of the second core half, incorporating a highly reactive layer. This layer was oriented at approximately 45 degrees to the bottom, to force the reaction front to travel orthogonal to the core orientation. The ignition plate is ignited by a starting powder 30. The reaction heat ignites the chemical core section on the left hand side. The reaction front then propagates toward the outlet end (bottom of the core in FIGS. 2A and 2B). When the reaction front reaches the end of the first section, it starts the reaction of the high reactivity layer. The high reactivity layer then starts the reaction of the section on the right hand side. Once the reaction front reaches the transition section, the reaction front causes the transition section to react. Heat from the transition section then starts the reaction of the second parallel section, and the reaction front then continues to propagate, from the outlet end toward the ignition end. The transition section and the two parallel sections may also be made into a single section with a slit in the middle and filled with an insulating layer. The oxygen generation flow curve of the one of the chemical oxygen generators with this chemical core arrangement is shown in FIG. 4. This chemical oxygen generator ran over 60 minutes. The peak at around 32 minutes was due to the high activity transition layer. The peak height can be reduced by modifying the shape of the high activity transition layer. The chemical core with the same length without a parallel section arrangement typically runs less than 30 minutes.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. A chemical oxygen generator including an oxygen generating composition for producing a supplemental breathable gas when a reaction front propagates through the oxygen generating composition, the chemical oxygen generator comprising:
    a chemical oxygen generator housing having an ignition end and an opposing oxygen outlet end;
    a chemical core high reactivity section including an oxygen generating composition disposed in said chemical oxygen generator housing;
    first and second parallel sequentially connected chemical core sections disposed in said chemical oxygen generator housing, said first and second parallel sequentially connected chemical core sections each including an oxygen generating composition and having first ends oriented toward said ignition end of said chemical oxygen generator, second ends oriented toward said outlet end of said chemical oxygen generator, and body portions between said first and second ends extending a length along a longitudinal axis of said chemical oxygen generator housing, said first end of said first parallel sequentially connected chemical core section being disposed immediately adjacent to and contiguous with said chemical core high reactivity section;
    a thermal insulation layer disposed in said chemical oxygen generator housing between said first end of said second parallel sequentially connected chemical core section and said first end of said first parallel sequentially connected chemical core section, and between said body of said second parallel sequentially connected chemical core section and said body of said first parallel sequentially connected chemical core section; and
    a chemical core transition section including an oxygen generating composition disposed in said chemical oxygen generator housing between and immediately adjacent to and contiguous with said second end of said first parallel sequentially connected chemical core section and said second end of said second parallel sequentially connected chemical core section.

2. The chemical oxygen generator of claim 1, wherein said high reactivity section includes an ignition plate disposed within said high reactivity section.

3. The chemical oxygen generator of claim 2, wherein said ignition plate and said high reactivity section are formed as a single piece.

4. The chemical oxygen generator of claim 1, wherein said first and second parallel sequentially connected chemical core sections are arranged generally in the form of a cylinder.

5. The chemical oxygen generator of claim 1, wherein said first and second parallel sequentially connected chemical core sections have a length substantially longer than a diameter of said first and second parallel sequentially connected chemical core sections.

6. The chemical oxygen generator of claim 1, wherein said first and second parallel sequentially connected chemical core sections have higher activity at said ignition end, and progressively less activity toward an opposing end of said first and second parallel sequentially connected chemical core sections.

7. The chemical oxygen generator of claim 1, wherein said first and second parallel chemical core sections are formed with equal cross sectional area.

8. The chemical oxygen generator of claim 1, wherein said thermal insulation layer comprises a plate formed of a refractory fiber material.

9. The chemical oxygen generator of claim 8, wherein said refractory fiber material comprises an alumino-silicate refractory ceramic fiber.

10. The chemical oxygen generator of claim 8, wherein said refractory fiber material comprises a ceramic fiber paper.

11. The chemical oxygen generator of claim 8, wherein said refractory fiber material comprises a ceramic wool impregnated with calcium hydroxide.

12. The chemical oxygen generator of claim 8, wherein said refractory fiber material comprises refractory board formed from calcium silicate.

13. The chemical oxygen generator of claim 8, wherein said refractory fiber material comprises glass wool.

14. The chemical oxygen generator of claim 1, wherein said transition section comprises a highly reactive oxygen generating composition layer.

15. The chemical oxygen generator of claim 1, wherein said transition section is oriented at approximately 45 degrees to a longitudinal axis of said chemical oxygen generator housing.

* * * * *